United States Patent [19]
Webb

[11] Patent Number: 5,678,456
[45] Date of Patent: Oct. 21, 1997

[54] GRIPPING CONDUIT SUPPORT COLLAR

[75] Inventor: Grant A. Webb, Howell, Mich.

[73] Assignee: Teleflex Incorporated, Plymouth Meeting, Pa.

[21] Appl. No.: 585,540

[22] Filed: Jan. 16, 1996

[51] Int. Cl.[6] .................................................. F16C 1/10
[52] U.S. Cl. .................. 74/502.4; 74/502.6; 74/500.5; 74/501.5 R; 248/65; 403/256
[58] Field of Search ......................... 74/500.5–502.6; 403/256, 257, 319, 326, 329; 248/65

[56] References Cited

U.S. PATENT DOCUMENTS

| | | |
|---|---|---|
| 2,128,040 | 8/1938 | Conners . |
| 2,559,759 | 7/1951 | Swart . |
| 3,139,768 | 7/1964 | Biesecker . |
| 3,916,723 | 11/1975 | Hawtree et al. .......... 74/501.5 R |
| 4,626,620 | 12/1986 | Plyler . |
| 5,347,882 | 9/1994 | Klotz ........................... 74/502.4 |
| 5,383,377 | 1/1995 | Boike ............................. 74/502 |
| 5,570,611 | 11/1996 | Poospisil et al. ............. 74/502.6 |
| 5,577,415 | 11/1996 | Reasoner ...................... 74/502.4 |
| 5,579,662 | 12/1996 | Reasoner ...................... 54/502.4 |

FOREIGN PATENT DOCUMENTS

| | | | |
|---|---|---|---|
| 0365243 | 4/1990 | European Pat. Off. ........... 74/502.6 |
| 0556064 | 8/1993 | European Pat. Off. ........... 74/502.6 |
| 0576387 | 12/1993 | European Pat. Off. ........... 74/502.6 |
| 5-209613 | 8/1993 | Japan ........................... 74/502.6 |

*Primary Examiner*—Vinh T. Luong
*Attorney, Agent, or Firm*—Howard & Howard

[57] ABSTRACT

A sleeve (16) having a shipping section (24) for loosely holding a collar (22) to allow the sleeve (16) to be adjusted axially along the conduit (14) to the desired support position. Therafter, a clamp, strap, or other support structure, (18) clamps a support section (21) of the sleeve (16) which is sufficiently rigid and strong to prevent collapse inwardly. To prevent further axial movement of the slave (16) along the conduit (14), the collar (16) is forced over a retention shoulder (28) to radially collapse a gripping section (20) of the sleeve as facilitated by longitudinal slits (26) in the sleeve (16).

10 Claims, 1 Drawing Sheet

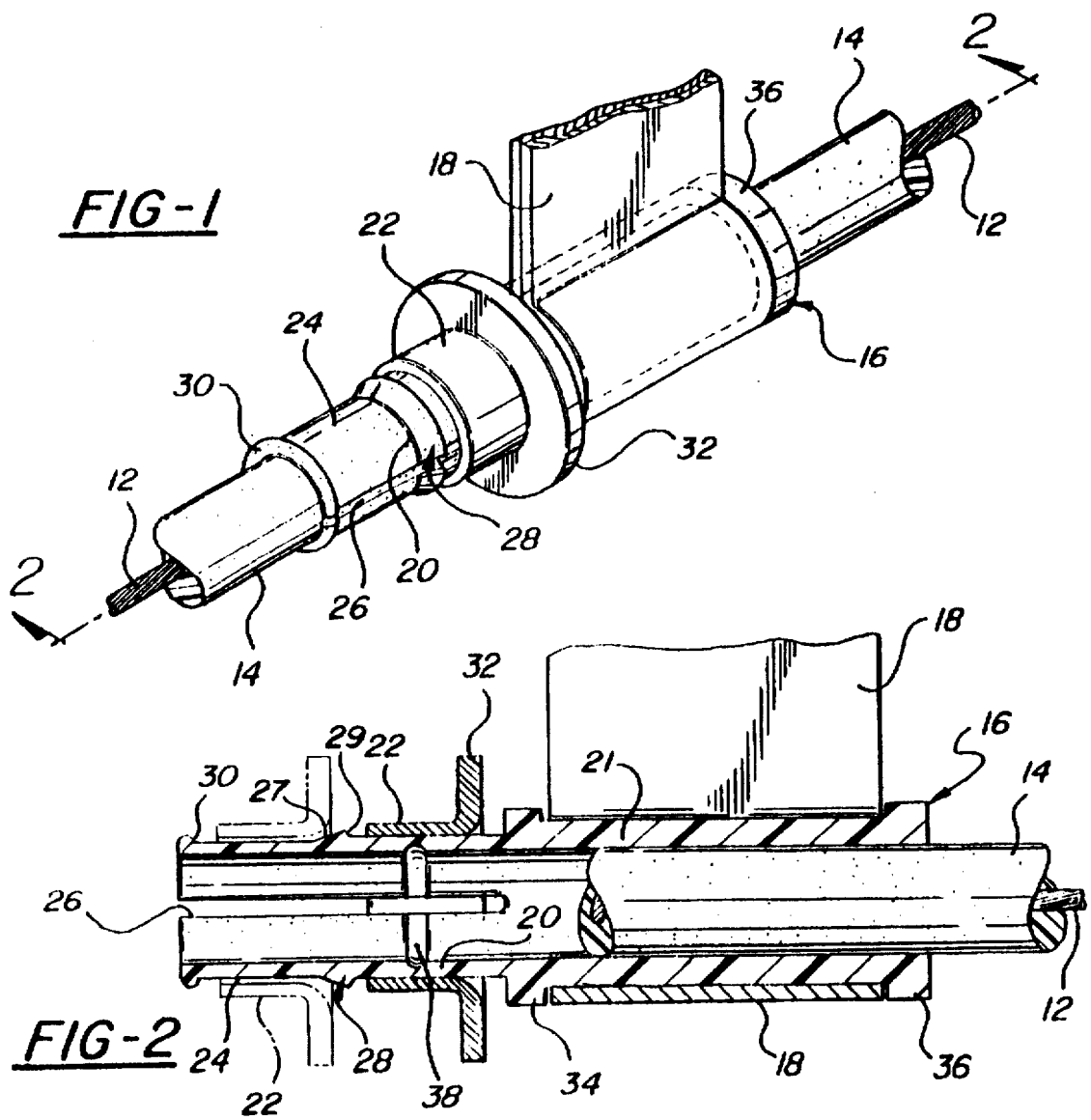
FIG-1
FIG-2
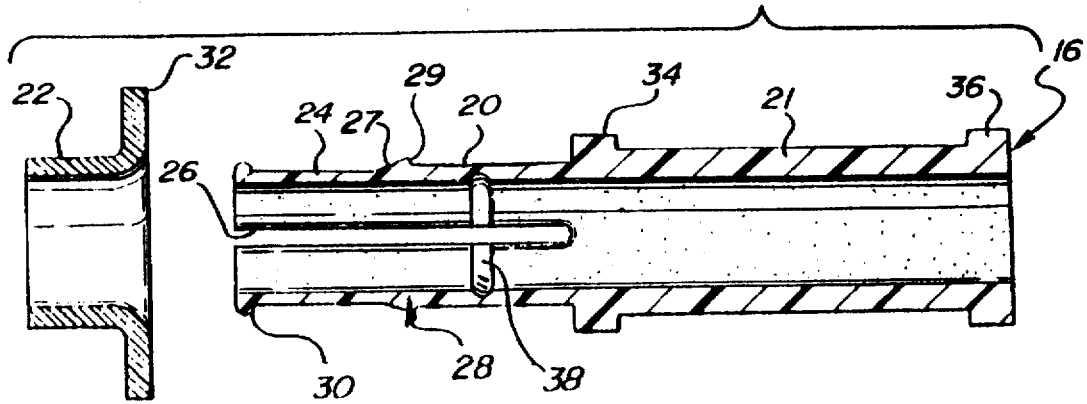
FIG-3

GRIPPING CONDUIT SUPPORT COLLAR

TECHNICAL FIELD

This invention relates to a motion transmitting remote control assembly of the type for transmitting motion in a curved path by a flexible motion transmitting core element movably supported in a conduit. More specifically, the invention relates to the attachment of the conduit to a support structure.

BACKGROUND OF THE INVENTION

These control assemblies are widely utilized in the automotive industry to adjust vents, heaters, etc., and to latch hoods, adjust mirrors, and various other devices.

Various grommets, fillings, ferrules, and the like, are known for attaching and supporting conduits of such remote control assemblies to support structure. Examples of such are shown in the U.S. Pat. No. 2,128,040 to Conners, U.S. Pat. No. 2,559,759 to De Swart, U.S. Pat. No. 3,139,768 to Biesecker and U.S. Pat. No. 4,626,620 to Plyler.

However, such prior art assemblies do not provide a support which is movable along the conduit until the conduit is in the fully installed position, yet may be made of plastic and provides sufficient holding force without collapsing the conduit.

SUMMARY OF THE INVENTION AND ADVANTAGES

A motion transmitting remote control assembly of the type for transmitting motion in a curved path by a flexible motion transmitting core element movably supported in the bore of the conduit and a support sleeve disposed about the conduit for supporting the conduit from a support structure. The assembly is characterized by the sleeve comprising a gripping section radially movable for gripping the conduit and an axially spaced support section radially immovable for attachment to the support structure without radially deforming said conduit, and a collar axially slidable unto the gripping section to radially contract the gripping section into gripping engagement with the conduit.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a fragmentary perspective view of a preferred embodiment of the subject invention;

FIG. 2 is a longitudinal cross sectional view taken along line 2—2 of FIG. 1 and showing the collar in phantom in the shipping position; and FIG. 3 is an exploded cross sectional view similar to FIG. 2.

DETAILED DESCRIPTION OF THE PREFERRED EMBODIMENT

Referring to the Figures, wherein like numerals reference like or corresponding parts throughout the several views, a motion transmitting remote control assembly constructed in accordance with the subject invention is generally shown at 10 in FIG. 1. The motion transmitting remote control assembly 10 is of the type for transmitting motion in a curved path by a flexible motion transmitting core element 12 movably supported in a conduit 14 having a bore therethrough, with the flexible motion transmitting core element 12 movably supported in the bore of the conduit 14. The core element is a wire or a plurality of stranded wire filaments. The conduit is generally of the type including an inner tubular member made of plastic and surrounded by a plurality of wire filaments disposed helically on a long lead thereabout with a plastic casing extruded about the long lay wires. The long lay wires are preferably not a full complement, i.e., there remains spacing therebetween to optimize weight and tensile strength as well as hoop strength. The subject invention is particularly suited for use with less than a full complement of long lay wires.

A support sleeve, generally indicated at 16, is disposed about the conduit 14 for supporting the conduit 14 from a support structure, such as the metal hanger clamp 18.

The assembly 10 is characterized by the sleeve 16 comprising a gripping section 20 radially movable for gripping the conduit 14 and an axially spaced support section 21 radially immovable for attachment to the support structure 18 without radially deforming the conduit 14. A collar 22 is also included and is axially slidable unto the gripping section 20 to radially contract the gripping section 20 into gripping engagement with the conduit 14. The sleeve 16 also includes a shipping section 24 for retaining the collar 16 in radially loose relationship about the sleeve 16 to allow the sleeve 16 to move axially along the conduit 14.

The gripping section 20 retains the collar 22 in radially contracting relationship about the sleeve 16 to radially contract the gripping section 20 of the sleeve 16 into gripping relationship with the conduit 14. The gripping section 20 also includes at least one slit 26 extending axially therealong for allowing the gripping section 20 of the sleeve 16 to contract. Preferably two diametrically opposite slits 26 are included, and in some cases the gripping section is divided into quarters by four slits 26; the slits may also be tapered so as to increase in width from the root to the open ends thereof. The slits 26 extend into the sleeve 16 from the end, through the shipping section 24 and through the gripping section 20 to a position next adjacent the support section 21.

The diameter of the shipping section 24 is smaller than the diameter of the gripping section 20. The diameter of the support section 21 is greater than the diameter of the gripping section 20. The diameter of the support section 21 is sufficient to provide sufficient wall thickness for hoop strength to prevent the support section from collapsing under radial clamping or holding force. For shipping and installation, the diameter of the shipping section 24 is less or no greater than the inner diameter of the collar 22 whereby there is a radial clearance between the collar 22 and the shipping section 24. However, the diameter of the gripping section 20 is greater than the inner diameter of the collar 22 whereby the collar 22 contracts the gripping section 20 radially inwardly. The interior of the gripping section may be knurled or include spikes for gripping the conduit 14.

An annular retention shoulder, generally indicated at 28, is disposed axially between the shipping section 24 and the gripping section 20 for retaining the collar 22 on the gripping section 20. More specifically, the retention shoulder 28 comprises a conical ramp 27 leading up to a radial shoulder 29 for facilitating axial movement of the collar 22 from the shipping 24 section to the gripping section 20. Of course, once on the gripping section 20 the collar 22 is in frictional gripping engagement with the outer diameter of the gripping section, but, nevertheless, the radial shoulder 28 prevents the collar 22 from inadvertently moving axially back to the shipping section. An annular ridge 30 is disposed at the entry end of the shipping section 24 for retaining the collar 22 on the shipping section 24 between the ridge 30 and the retention shoulder 28.

The collar 22 includes a radially extending flange 32 and is made of metal. Plastic materials creep and in many environments such creep is undesirable. Accordingly, by making the collar of metal, the creep associated with plastic is avoided. However, the sleeve is preferably made of plastic. An annular projection or flange is disposed at each end of the support section 21 for saddling support structure 18 therebetween. Specifically, an annular projection or band 34 is disposed between the gripping section 20 and the support section 21 while another like projection or annular band 36 is disposed at the end of the support section 21. Therefore, the ridge 30 is at one end of the sleeve 16 and the projection 36 is at the other end of the sleeve 16.

During the fabrication of the control assembly 10, the sleeve 16 and collar 22 are disposed on the conduit 14. Thereafter, fittings or ferrules may be disposed at the ends of the conduit as is well known in the art. The collar 22 is forced over the ridge 30 to be loosely retained on the shipping section 24 between the ridge 30 and the shoulder 28. In this shipping position, the sleeve 16 is loose enough around the conduit 14 to be freely slidable therealong. Accordingly, once the assembly is installed, the sleeve 16 is manually slid along the conduit 14 to the desired support position whereupon a support strap, clamp, or the like, 18 is clamped onto the support section 21 of the sleeve to, in turn, support the conduit 14. To fix the assembly in position, the collar 22 is forced over the shoulder 28 and radially contract the gripping section 20 into gripping frictional engagement with the conduit 14, such radially inward movement being facilitated by the slits 26.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) of the type for transmitting motion in a curved path comprising;

a conduit (14) having a bore therethrough, a flexible motion transmitting core element (12) movably supported in said bore of said conduit (14), a support sleeve (16) disposed about said conduit (14), said sleeve (16) comprising a gripping section (20) with an outer diameter and at least one slit (26) extending axially therealong and a shipping section (24) an outer diameter smaller than said outer diameter of said gripping section (20) and an axially spaced support section (21) having sufficient hoop strength to be radially immovable, and a collar (22) having inner diameter no less than said outer diameter of said shipping section (24) and less than said outer diameter of said gripping section (20) and axially slidable onto said gripping section (20) to radially contract said gripping section (20) into gripping engagement with said conduit (14) whereby said shipping section (24) retains said collar (22) to allow said sleeve (16) to move axially along said conduit (14) and said collar (22) is axially slidable to said gripping section (20) in radially contracting relationship about said gripping section (20) as said slit allows said gripping section (20) to contract into gripping relationship with said conduit (14) and whereby said support section (21) may be gripped with a radial force by support structure (18) without radially deforming said conduit (14).

2. An assembly as set forth in claim 1 wherein the outer diameter of said support section (21) is greater than said outer diameter of said gripping section (20).

3. An assembly as set forth in claim 1 including an annular retention shoulder (28) disposed axially between shipping section (24) and said gripping section (20) for retaining said collar (22) on said gripping section (20).

4. An assembly as set forth in claim 3 wherein said retention shoulder (28) comprises a ramp (27) leading up to a radial shoulder (29) for facilitating axial movement of said collar (22) from said shipping section (24) to said gripping section (20).

5. An assembly as set forth in claim 4 including an annular ridge (30) disposed at the end of said shipping section (24) for retaining said collar (22) on said shipping section (24) between said ridge (30) and said retention shoulder (28).

6. An assembly as set forth in claim 5 wherein the outer diameter of said support section (21) is greater than said outer diameter of said gripping section (20).

7. An assembly as set forth in claim 6 wherein said collar (22) includes a radially extending flange (32).

8. An assembly as set forth in claim 7 wherein said collar (22) is made of metal.

9. An assembly as set forth in claim 8 wherein said sleeve (16) is made of plastic.

10. An assembly as set forth in claim 9 including a projection (34,36) at each end of said support section (21) for saddling support structure (18) therebetween.

* * * * *